US012679092B2

(12) United States Patent
Otome et al.

(10) Patent No.: US 12,679,092 B2
(45) Date of Patent: Jul. 14, 2026

(54) LIQUID DISCHARGE HEAD, LIQUID DISCHARGE UNIT, AND LIQUID DISCHARGE APPARATUS

(71) Applicants: Yukio Otome, Ibaraki (JP); Tomoaki Murakami, Ibaraki (JP)

(72) Inventors: Yukio Otome, Ibaraki (JP); Tomoaki Murakami, Ibaraki (JP)

(73) Assignee: RICOH COMPANY, LTD., Tokyo (JP)

(*) Notice: Subject to any disclaimer, the term of this patent is extended or adjusted under 35 U.S.C. 154(b) by 270 days.

(21) Appl. No.: 18/381,655

(22) Filed: Oct. 19, 2023

(65) Prior Publication Data

US 2024/0131842 A1 Apr. 25, 2024
US 2024/0227396 A9 Jul. 11, 2024

(30) Foreign Application Priority Data

Oct. 24, 2022 (JP) ................................ 2022-169756

(51) Int. Cl.
*B41J 2/14* (2006.01)

(52) U.S. Cl.
CPC ....... *B41J 2/14274* (2013.01); *B41J 2/14233* (2013.01); *B41J 2002/14475* (2013.01); *B41J 2202/11* (2013.01)

(58) Field of Classification Search
CPC ................ B41J 2/14274; B41J 2/14233; B41J 2002/14475; B41J 2202/11
See application file for complete search history.

(56) References Cited

U.S. PATENT DOCUMENTS 6,101,347 A 8/2000 Rokutanda et al.
2004/0212646 A1 10/2004 Nishida et al.
2007/0054221 A1* 3/2007 Yokouchi ............. G03F 7/2014 430/311
2017/0157924 A1 6/2017 Otome et al.
(Continued)

FOREIGN PATENT DOCUMENTS

CN 1646322 A 7/2005
CN 101037042 A 9/2007
(Continued)

OTHER PUBLICATIONS

Office Action mailed Nov. 27, 2025 in corresponding Chinese Patent Application No. 202311255060.3 (15 pages; with English translation).

(Continued)

*Primary Examiner* — Geoffrey S Mruk
(74) *Attorney, Agent, or Firm* — XSENSUS LLP

(57) ABSTRACT

A liquid discharge head includes: multiple nozzles; multiple individual chambers respectively communicating with the multiple nozzles; a common chamber communicating with each of the multiple individual chambers; multiple fluid restrictors between each of the multiple individual chambers and the common chamber; and multiple actuators driven to cause a liquid in the multiple individual chambers to be discharged from the multiple nozzles, a meniscus formed at each of the multiple nozzles has a natural period of vibration different from each of: a resonant period of the common chamber; half of the resonant period of the common chamber; and a quarter of the resonant period of the common chamber.

6 Claims, 6 Drawing Sheets

(56) References Cited

U.S. PATENT DOCUMENTS

| | | | |
|---|---|---|---|
| 2017/0253062 | A1 | 9/2017 | Murakami et al. |
| 2018/0126731 | A1 | 5/2018 | Ishikawa et al. |
| 2018/0194135 | A1 | 7/2018 | Iwama et al. |
| 2018/0272709 | A1 | 9/2018 | Iwata et al. |
| 2018/0272740 | A1 | 9/2018 | Otome et al. |
| 2018/0272743 | A1 | 9/2018 | Nakai et al. |
| 2019/0224974 | A1 | 7/2019 | Kihira et al. |
| 2020/0331262 | A1* | 10/2020 | Andou ........................ B41J 2/18 |
| 2020/0346457 | A1 | 11/2020 | Iwata et al. |
| 2022/0126575 | A1 | 4/2022 | Otome et al. |

FOREIGN PATENT DOCUMENTS

| | | | |
|---|---|---|---|
| CN | 102189801 | A | 9/2011 |
| CN | 111319357 | A | 6/2020 |
| JP | H11-277743 | A | 10/1999 |
| JP | 2006096042 | A | 4/2006 |
| JP | 2010-201775 | A | 9/2010 |
| JP | 2011110730 | A | 6/2011 |
| JP | 2017-105167 | A | 6/2017 |
| JP | 2019098614 | A | 6/2019 |
| JP | 2019127030 | A | 8/2019 |

OTHER PUBLICATIONS

Notification of Grant issued May 7, 2026 in Chinese Patent Application No. 202311255060.3 (8 pages; with English translation).

* cited by examiner

LIQUID DISCHARGE HEAD, LIQUID DISCHARGE UNIT, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-169756, filed on Oct. 24, 2022, in the Japan Patent Office, the entire disclosure of which is hereby incorporated by reference herein.

BACKGROUND

Technical Field

The present embodiment relates to a liquid discharge head, a liquid discharge unit, and a liquid discharge apparatus.

Related Art

A liquid discharge head includes multiple nozzles; multiple individual chambers; multiple fluid restrictors; a common chamber; and multiple actuators. The multiple nozzles is in communication one-to-one with the multiple individual chambers. The multiple individual chambers is in communication one-to-one with the fluid restrictors. The multiple individual chambers corresponds one-to-one to the multiple actuators. Liquid is supplied from the common chamber to each of the multiple individual chambers through the corresponding fluid restrictor. The liquid in each of the multiple individual chambers is discharged through the corresponding nozzle due to drive of the corresponding actuator.

Examples of such a liquid discharge head include a liquid discharge head in which an actuator is driven such that the frequency of a pressure wave propagating to liquid in a common supply passage as a common chamber is not equal to the resonance frequency of the common supply passage. This arrangement results in inhibition of the common supply passage from resonating and inhibition of variations in the discharge rate of the liquid droplets from the nozzle.

However, such a liquid discharge head may have an issue that a drive frequency for driving the actuator is restricted.

SUMMARY

A liquid discharge head includes: multiple nozzles; multiple individual chambers respectively communicating with the multiple nozzles; a common chamber communicating with each of the multiple individual chambers; multiple fluid restrictors between each of the multiple individual chambers and the common chamber; and multiple actuators driven to cause a liquid in the multiple individual chambers to be discharged from the multiple nozzles, a meniscus formed at each of the multiple nozzles has a natural period of vibration different from each of: a resonant period of the common chamber; half of the resonant period of the common chamber; and a quarter of the resonant period of the common chamber.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
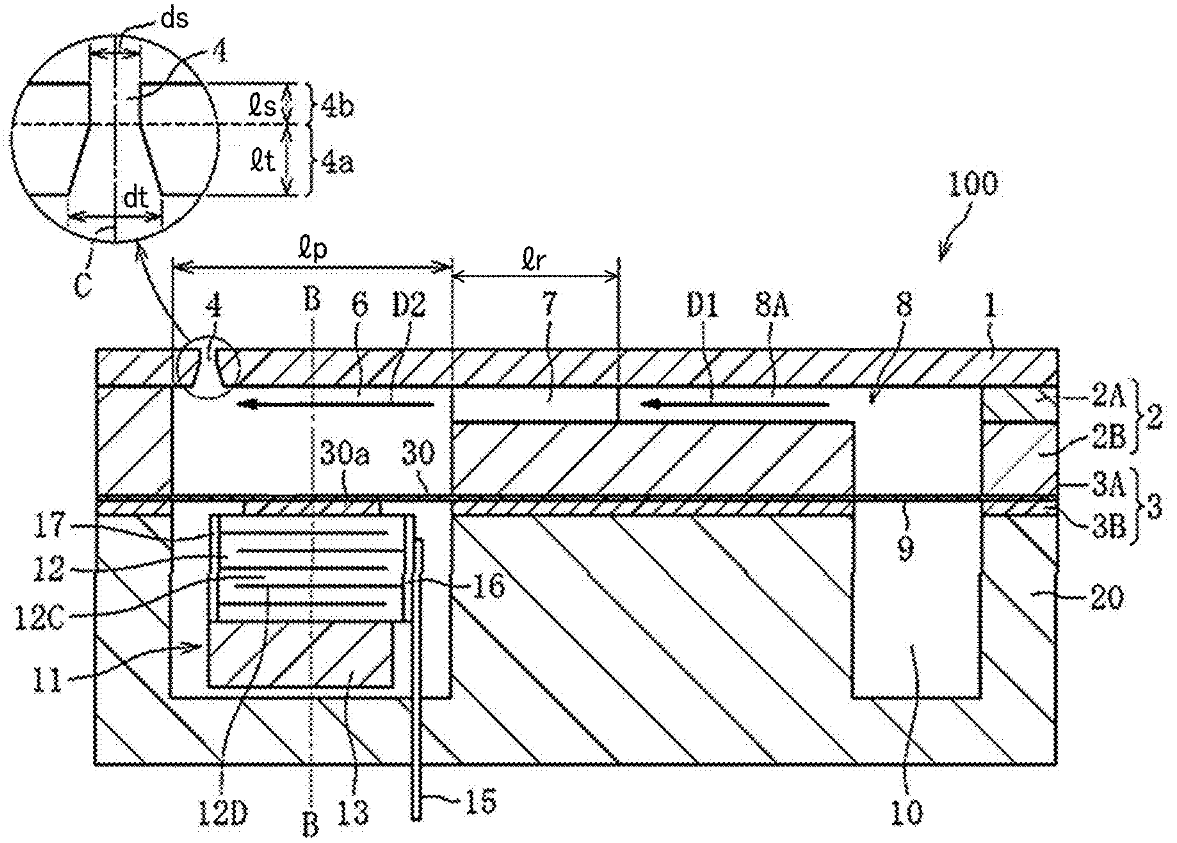
FIG. 1 is a cross-sectional view of a liquid discharge head according to the present embodiment taken along a plane orthogonal to a nozzle array direction.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an embodiment of a liquid discharge head according to the present embodiment will be described.

FIG. 1 is a cross-sectional view of a liquid discharge head 100 according to the present embodiment taken along a plane orthogonal to a nozzle array direction.

Figure 2:
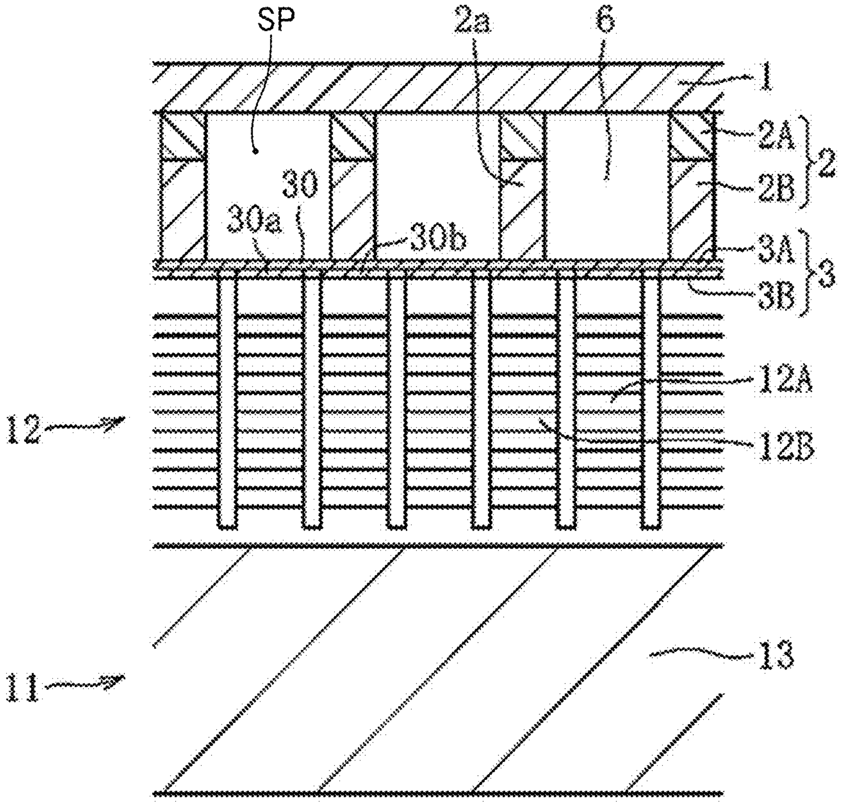
FIG. 2 is a cross-sectional view of the liquid discharge head taken along the nozzle array direction.

FIG. 2 is a cross-sectional view of the liquid discharge head 100 taken along the nozzle array direction.

Figure 3:
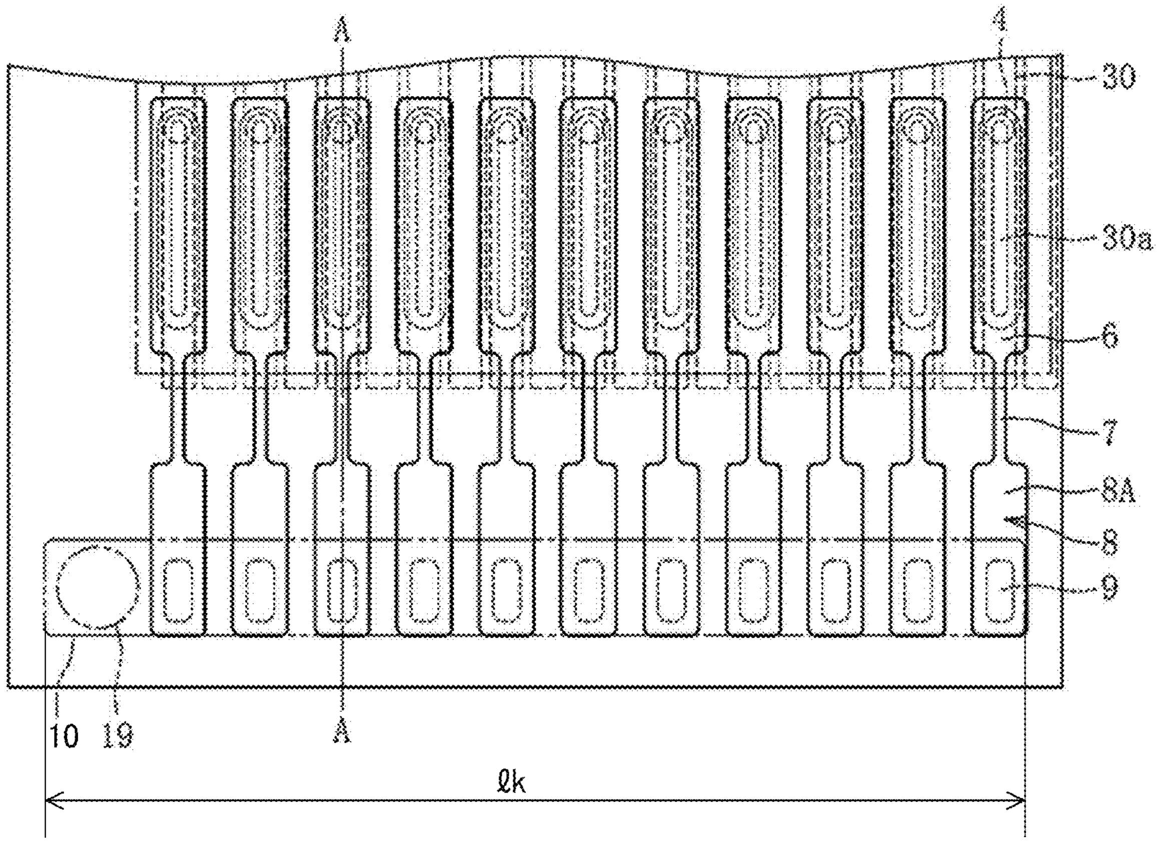
FIG. 3 is a cross-sectional view of the liquid discharge head taken along a plane parallel to the nozzle face of the liquid discharge head.

FIG. 3 is a cross-sectional view of the liquid discharge head 100 taken along a plane parallel to the nozzle face of the liquid discharge head 100.

The liquid discharge head 100 according to the present embodiment includes a nozzle plate 1, a channel plate 2, and a diaphragm member 3 including a thin film member as a wall face member. The nozzle plate 1, the channel plate 2, and the diaphragm member 3 are layered and joined. The liquid discharge head 100 further includes a piezoelectric actuator 11 as an actuator and a frame member 20 as a common chamber member. The piezoelectric actuator 11 displaces the diaphragm member 3.

The nozzle plate 1 is formed of a metal member such as a stainless steel (SUS) material. The nozzle plate 1 has multiple nozzles 4 for discharging liquid. The multiple nozzles 4 is arrayed in the nozzle array direction orthogonal to the drawing plane in FIG. 1. In the present embodiment, as an example, 320 nozzles 4 are each provided at the interval of 150 dpi. Each nozzle 4 is formed by etching or pressing, for example.

The nozzle 4 includes a tapered portion 4*a* and a straight portion 4*b*. The tapered portion 4*a* is in communication with the pressure generation chamber 6 side as an individual chamber. The straight portion 4*b* is in communication with the outside of the nozzle plate 1. The tapered portion 4*a* has a tapered face. The tapered portion 4*a* has a diameter that reduces upward in the figure along the tapered face. The straight portion 4*b* has a constant diameter.

The channel plate 2 includes multiple (here, two pieces of) tabular members 2A and 2B layered in the thickness direction. The tabular members 2A and 2B are each formed of a metal material such as a SUS material.

The channel plate 2 is provided with multiple pressure generation chambers 6, multiple fluid restrictors 7, and multiple guide channels 8 at predetermined intervals in the nozzle array direction in which the multiple nozzles 4 is arrayed (see FIG. 3). Each nozzle 4 is in communication with the corresponding pressure generation chamber 6. The pressure generation chamber 6 is in communication with the corresponding fluid restrictor 7. The fluid restrictor 7 is in communication with the corresponding guide channel 8.

The tabular members 2A and 2B are provided, by etching or pressing, with multiple through holes corresponding to the multiple the pressure generation chambers 6, the multiple fluid restrictors 7, and the multiple guide channels 8. Thus, the channel plate 2 has the multiple the pressure generation chambers 6, the multiple fluid restrictors 7, and the multiple guide channels 8. The multiple fluid restrictors 7, however, corresponds one-to-one to the multiple through holes of the tabular member 2A. Portions without holes in the thickness direction of the tabular members 2A and 2B are layered to form a partition wall 2*a* illustrated in FIG. 2.

The frame member 20 is made of, for example, a SUS material. The SUS material is cut to form a common chamber 10 and a supply port 19 (see FIG. 3) in communication with the common chamber 10. The common chamber 10 is in communication with the multiple guide channels 8. As illustrated in FIG. 3, each fluid restrictor 7 is narrower than the corresponding pressure generation chamber 6 and the corresponding guide channel 8 as another ink channel (liquid channel).

The diaphragm member 3 is partially included in the wall faces of each pressure generation chamber 6 with which the channel plate 2 is provided. The diaphragm member 3 has a two-layer structure including a first layer 3A and a second layer 3B. The diaphragm member 3 may have a single-layer structure or a structure including not less than three layers. A portion partially included in the wall face of the pressure generation chamber 6 on the channel plate 2 side of the first layer 3A is included in a deformable vibration region 30 (diaphragm). The first layer 3A has an opening 9 through which the corresponding guide channel 8 and the common chamber 10 are in communication with each other.

The diaphragm member 3 is formed of a metal plate of nickel (Ni), and is fabricated by electroforming. The material of the diaphragm member 3 is not limited to the metal plate of Ni, and thus the diaphragm member 3 can be formed of a metal member different from the metal plate of Ni or can be formed of a multilayer member of resin and metal.

Ink as liquid is introduced from the common chamber 10 to the guide channel 8 through the opening 9. The ink is supplied to the pressure generation chamber 6 through from the guide channel 8 and the fluid restrictor 7. The opening 9 may be provided with a filter.

The piezoelectric actuator 11 is disposed on the side opposite to the pressure generation chamber 6 side of the diaphragm member 3. The piezoelectric actuator 11 includes a piezoelectric member 12 and a base member 13 on which the piezoelectric member 12 is joined with an adhesive. The piezoelectric member 12 includes a required number of columnar piezoelectric elements 12A and 12B arranged at predetermined intervals in the nozzle array direction, and has a comb shape. For formation of the comb-shaped piezoelectric member 12, a piezoelectric member joined on the base member 13 is subjected to grooving based on half-cut dicing.

Each piezoelectric element 12A includes a member same as the corresponding piezoelectric element 12B. The piezoelectric element 12A (driver) drives due to application of a drive waveform. However, the piezoelectric element 12B (non-driver) simply serves as a support due to non-application of a drive waveform. The piezoelectric element 12A is joined to a protrusion 30*a*. The protrusion 30*a* is an island-shaped thick portion on the vibration region 30. The piezoelectric element 12B is joined to a protrusion 30*b* as a thick portion of the diaphragm member 3.

The piezoelectric member 12 includes piezoelectric layers 12C and internal electrodes 12D layered alternately. Each piezoelectric layer 12C is made of lead zirconate titanate (PZT) and has a thickness of 10 to 50 μm.

Each internal electrode 12D is made of silver palladium (AgPd) and has a thickness of several micrometers. The internal electrode 12D is extended to one end face and the other end face in the longitudinal direction of the pressure generation chamber 6 of the piezoelectric member 12. One end of the internal electrode 12D is connected to an individual electrode 16 and the other end of the internal electrode 12D is connected to a common electrode 17. The individual electrode 16 and the common electrode 17 are end face electrodes (external electrodes).

The individual electrode 16 includes multiple individual electrodes resulting from dividing based on half-cut dicing of an electrode provided on the outer end face of the piezoelectric member 12. The length of the electrode provided on the outer end face of the piezoelectric member 12 is limited in advance due to, for example, notching. The common electrode 17 is not divided by dicing, and is conductive in this form.

A flexible printed circuits 15 (FPC) as a flexible wiring member is connected to the individual electrode 16 by solder joint. The common electrode 17 is joined to the ground (Gnd) electrode of the FPC 15 through an electrode layer provided on the piezoelectric member 12 (provided so as to wrap around an end portion of the piezoelectric member 12). A driver integrated circuit (IC) is mounted on the FPC 15. The driver IC controls application of voltage to the piezoelectric element 12A.

In the liquid discharge head 100 having such a configuration as described above, due to application of a drive waveform (pulse voltage of 10 to 50 V) to the piezoelectric element 12A in response to a recording signal, the piezoelectric element 12A is displaced in the layering direction. This displacement of the piezoelectric elements 12A pressurizes the ink in the pressure generation chambers 6 through the diaphragm member 3. As a result, the ink pressure in the pressure generation chamber 6 increases, and ink droplets are discharged through the nozzle 4.

The ink pressure in the pressure generation chamber 6 decrease with the end of the ink droplet discharge. Then, due to the inertia of the flow of ink and the displacement of the piezoelectric element 12A in the process of discharging a drive pulse, a negative pressure is generated in the ink in the pressure generation chamber 6, and the process proceeds to ink filling (ink refilling) process.

At this time, ink supplied from an external ink tank flows into the common chamber 10. The ink passes through the opening 9 from common chamber 10. The ink passes through the guide channel 8 and the fluid restrictor 7 to be supplied into the pressure generation chamber 6.

The fluid restrictor 7 exhibits effect of generating ink pressure in the pressure generation chamber 6 for discharge and reducing the variation of the pressure remaining in the ink in the pressure generation chamber 6 after discharge. However, the fluid restrictor 7 may become a resistance against ink filling (ink refilling) due to surface tension.

Appropriately selecting the configuration of the fluid restrictor 7 results in achievement of balance between the pressure generation, the reduction of residual pressure variation, and ink refill time.

In such a liquid discharge head 100 as described above, when a drive waveform is applied to the piezoelectric element 12A to displace the piezoelectric element 12A, a pressure wave having a period of the drive waveform (hereinafter, referred to as drive pressure wave) is generated in the pressure generation chambers 6. The drive pressure wave propagates to the common chamber 10 through the fluid restrictor 7 and the guide channel 8. When the period of the drive pressure wave is close to the resonant period of the pressure wave of the ink in the common chamber 10 determined by the compliance and inertance of the ink in the common chamber 10, resonance occurs in the common chamber 10, resulting in an increase in the amplitude of the pressure wave having the resonant period (hereinafter, referred to as resonant pressure wave) in the common chamber 10. For example, for formation of horizontal lines at constant intervals on a sheet, in a case where such piezoelectric elements 12A as described above are driven with a drive waveform having a period close to the resonant period of the pressure wave of the ink in the common chamber 10 in a large number of pressure generation chambers 6, the resonant pressure waves are superimposed in the common chamber 10. As a result, the amplitude of the resonant pressure waves further increases. Such a resonant pressure wave in the common chamber 10 propagates to each pressure generation chamber 6 through the corresponding guide channel 8 and the corresponding fluid restrictor 7, so that the pressure variation in the pressure generation chamber 6 increases in some cases. As a result, the discharge rate of the droplets from the corresponding nozzle varies, and the non-uniformity of the landing position of the liquid droplets on the medium such as a sheet may occur. In addition, the volume of the discharged liquid droplets increases or decreases, and the landing area of the droplets on the medium such as a sheet may occur. As a result, print quality is deteriorated in some cases.

Therefore, it is also conceivable that the piezoelectric elements 12A are not driven at a drive frequency close to the resonance frequency of the common chamber 10 such that such a resonant pressure wave as described above is not generated. However, because the piezoelectric elements 12A cannot be driven at a drive frequency close to the resonance frequency of the common chamber 10, a desired image may not be obtained.

The reason of the pressure variation in such a pressure generation chamber 6 as described above is increased by the resonant pressure wave is that the pressure wave having the natural period of vibration of the meniscus formed at the corresponding nozzle generated in the pressure generation chamber 6 strengthens with the resonant pressure wave and the drive pressure wave, and thus the pressure variation in the pressure generation chamber 6 increase. Due to the increased pressure variation, the uniformity of the landing position and the uniformity of the landing area are poor, and the print quality is deteriorated to an allowable level. The pressure wave having the natural period of vibration of the meniscus is generated as follows. After ink discharge, the meniscus of the nozzle is retracted to the pressure generation chamber 6 side and then reduced by free vibration, and is located at a predetermined position in the nozzle. Due to the free vibration of the meniscus, a pressure wave having a natural period of vibration of the meniscus is generated in the pressure generation chamber 6. When the natural period of vibration of the meniscus is close to any of the period of the resonant pressure wave, half of the period of the resonant pressure wave, and a quarter of the period of the resonant pressure wave, the pressure wave having the natural period of vibration of the meniscus strengthens with the resonant pressure wave and the drive frequency. Thus, the pressure variation in the pressure generation chamber 6 increases, resulting in deterioration in print quality.

Therefore, in the present embodiment, the natural period of vibration of the meniscus is made different from the resonant period of the common chamber 10, half of the resonant period of the common chamber 10, and a quarter of the resonant period of the common chamber 10. As a result, when driving is performed at a drive frequency close to the resonance frequency of the common chamber 10, the pressure wave having the natural period of vibration of the meniscus is inhibited from strengthening with the resonant pressure wave and the drive pressure wave, and the pressure variation in the pressure generation chamber 6 can be suppressed. Therefore, the non-uniformity of the landing position and the non-uniformity of the landing area of the liquid droplets on the medium such as a sheet can be suppressed to an allowable level, and the print quality can be made to the allowable level.

The natural period of vibration of the meniscus and the resonant period of the common chamber 10 can be obtained by a mathematical expression on the basis of the shape of the pressure generation chamber 6, the shape of the common chamber 10, the density of the ink, the velocity of sound of the ink, and the surface tension. The natural period of vibration of the meniscus is determined by the compliance (Cm) of the meniscus formed at the nozzle 4, the inertance (Lp, Lr, Lt, Ls) of the ink of the pressure generation chamber 6, the fluid restrictor 7, and the nozzle 4. When the natural period of vibration of the meniscus is defined as Tmr, the natural period of vibration Tmr of the meniscus can be obtained from the following Expression (1):

$$Tmr=2\pi\times\sqrt{\ }\{(Lp+Lr+Lt+Ls)\times Cm\} \qquad (1)$$

where $Lp=(6/5)\times\rho\times(lp/sp)$, $Lr=(6/5)\times\rho\times(lr/sr)$, $Lt=4\times\rho\times lt/(\pi\times dt\times ds)\times 1.45$, $Ls=4\times\rho\times ls/(\pi\times ds^2)\times 1.45$, and $Cm=\pi\times ds^4/(128\times\gamma)$ where ρ represents the density of the ink ¥[kg/m3], lp represents the length ¥[m] in the ink flow direction (arrow D2 in FIG. 1) of the pressure generation chamber 6 from the fluid restrictor 7 to the pressure generation chamber 6 (see FIG. 1), sp represents the cross-sectional area ¥[m2] perpendicular to the ink flow direction (arrow D2 in FIG. 1) of the pressure generation chamber 6 (see FIG. 2), lr represents the length ¥¥[m] in the ink flow direction (arrow D1 in FIG. 1) of the fluid restrictor 7 (see FIG. 1), sr represents the cross-sectional area ¥[m2] perpendicular to the ink flow direction (arrow D1 in FIG. 1) of the fluid restrictor 7, lt represents the length ¥[m] of the tapered portion 4*a* of the nozzle (see FIG. 1), ls represents the length ¥[m] of the straight portion 4*b* of the nozzle (see FIG. 1), dt represents the maximum diameter ¥[m] of the tapered portion 4*a* of the nozzle (see FIG. 1), ds represents the diameter ¥[m] of the straight portion 4*b* of the nozzle (see FIG. 1), and γ represents the surface tension of the ink ¥[N/m].

When the nozzle includes the straight portion 4*b*, the length lt of the tapered portion 4*a* of the nozzle is zero and the inertance Lt of the tapered portion 4*a* of the nozzle is zero. When the nozzle includes the tapered portion 4*a*, the length ls of the straight portion 4*b* of the nozzle is zero and the inertance Ls of the straight portion 4*b* of the nozzle is zero.

The resonant period of the common chamber 10 is determined by the compliance Ck and the inertance Lk of the ink in the common chamber 10. Therefore, when the resonant period of the common chamber 10 is defined as Tk, the resonant period Tk of the common chamber 10 can be obtained from the following Expression (2):

$$Tk=2\pi\times\sqrt{(Lk\times Ck)} \qquad (2)$$

where $Lk=6/5\times\rho\times(lk/sk)$, and $Ck=lk\times sk/(\rho\times c^2)$ where ρ represents the density of the ink ¥[kg/m3], c represents the velocity of sound of the ink ¥[m/s], lk represents the length ¥[m] of the common chamber 10 in the array direction in which the pressure generation chambers 6 are arrayed (see FIG. 3), and sk represents the cross-sectional area ¥[m2] of the common chamber 10 perpendicular to the direction in which the pressure generation chambers 6 are arrayed.

As described above, the natural period of vibration Tmr of the meniscus and the resonant period Tk of the common chamber 10 are determined on the basis of the shape of the liquid discharge head 100 and the property of the ink. Therefore, depending on the shape of the liquid discharge head 100, the natural period of vibration of the meniscus can be made different from the resonant period of the common chamber 10, half of the resonant period of the common chamber 10, and a quarter of the resonant period of the common chamber 10.

The array direction of the pressure generation chambers 6 are parallel to the nozzle array direction of the nozzles 4.

Next, the verification test performed by the person of the present embodiment will be described.

In the verification test, multiple liquid discharge heads different in the ratio (Tmr/Tk) of the natural period of vibration Tmr of the meniscus and the resonant period Tk of the common chamber 10 was prepared. Then, a drive waveform having the same period as the resonant period of the pressure wave of the ink in each common chamber 10 was applied to all piezoelectric elements 12A. Liquid droplets were discharged at a predetermined period from all the channels of the nozzles. A test image including multiple horizontal line images was printed on a sheet. Then, the test image was visually checked whether or not there were the non-uniformity of the landing position and the non-uniformity of the landing area. In the test image, when the non-uniformity of the landing position and the non-uniformity of the landing area were not observed, "G (Good)" determination was made; when at least one of the non-uniformity of the landing position and the non-uniformity of the landing area was observed but the observed non-uniformity was within the allowable range, "A (Acceptable)" determination was made; and when at least one of the non-uniformity of the landing position and the non-uniformity of the landing area was out of the allowable range, "P (Poor)" determination was made. Table 1 below illustrates the results of the verification test.

TABLE 1

| | Tmr/Tk | | | | | | |
|---|---|---|---|---|---|---|---|
| | 0.01 | 0.2 | 0.22 | 0.25 | 0.28 | 0.3 | 0.35 |
| Print quality | G | G | A | P | A | G | G |

| | Tmr/Tk | | | | | | |
|---|---|---|---|---|---|---|---|
| | 0.4 | 0.45 | 0.5 | 0.55 | 0.6 | 0.7 | 0.8 |
| Print quality | G | A | P | A | G | G | G |

| | Tmr/Tk | | | | |
|---|---|---|---|---|---|
| | 0.9 | 1 | 1.1 | 1.2 | 10 |
| Print quality | A | P | A | G | G |

(Print quality G: Good, A: Acceptable (Observed non-uniformity of landing position and landing area but within allowable range), P: Poor (Out of allowable range)

As illustrated in Table 1 above, when the natural period of vibration Tmr of the meniscus is Tmr/Tk=1 that is the same as the resonant period of the common chamber 10, when the natural period of vibration Tmr of the meniscus is Tmr/Tk=0.5 that is half of the resonant period of the common chamber 10, or when the natural period of vibration Tmr of the meniscus is Tmr/Tk=0.25 that is a quarter of the resonant period of the common chamber 10, the non-uniformity of the landing position and the non-uniformity of the landing area are conspicuous and the print quality is out of the allowable range, so that the "x" determination is made.

As illustrated in Table 1, when any of the following conditions is satisfied: Tmr/Tk≤0.22, 0.28≤Tmr/Tk≤0.45, 0.55≤Tmr/Tk≤0.9, and 1.1≤Tmr/Tk, the non-uniformity of the landing position and the non-uniformity of the landing area are suppressed, so that the print quality falls within the allowable range.

Further, it is found that by satisfying any of the following conditions: Tmr/Tk≤0.20, 0.3≤Tmr/Tk≤0.4, 0.6≤Tmr/Tk≤0.8, and 1.2≤Tmr/Tk, the non-uniformity of the landing position and the non-uniformity of the landing area are not confirmed and good print quality is obtained.

From the above verification test, it is confirmed that, even if all the piezoelectric elements 12A are driven at the resonant period of the common chamber 10, by making the natural period of vibration Tmr of the meniscus different from the resonant period Tk of the common chamber 10, half of the resonant period Tk of the common chamber 10, and a quarter of the resonant period Tk of the common chamber 10, the non-uniformity of the landing position and the non-uniformity of the landing area can be suppressed and an image with an allowable level of quality can be obtained.

That is, it is found that, in the pressure variation in the pressure generation chamber 6 having the resonant pressure wave (pressure wave generated by resonating of the common chamber 10), the variation of the discharge rate of the liquid droplets does not occur to such an extent that the non-uniformity of the landing position and the non-uniformity of the landing area are not more than the allowable level but the variation of the discharge rate of the liquid droplets occurs such that the non-uniformity of the landing position and the non-uniformity of the landing area is not more than the allowable level by strengthening with the pressure wave of the natural period of vibration of the meniscus. Therefore, by making the natural period of vibration Tmr of the meniscus different from the resonant period Tk of the common chamber 10, a half of the resonant period Tk of the common chamber 10, and a quarter of the resonant period of the common chamber 10, good print quality can be obtained without restriction on the drive frequency.

Next, a liquid discharge apparatus to which a liquid discharge head 100 according to the embodiment can be applied will be described with reference to FIGS. 4 and 5.

Figure 4:
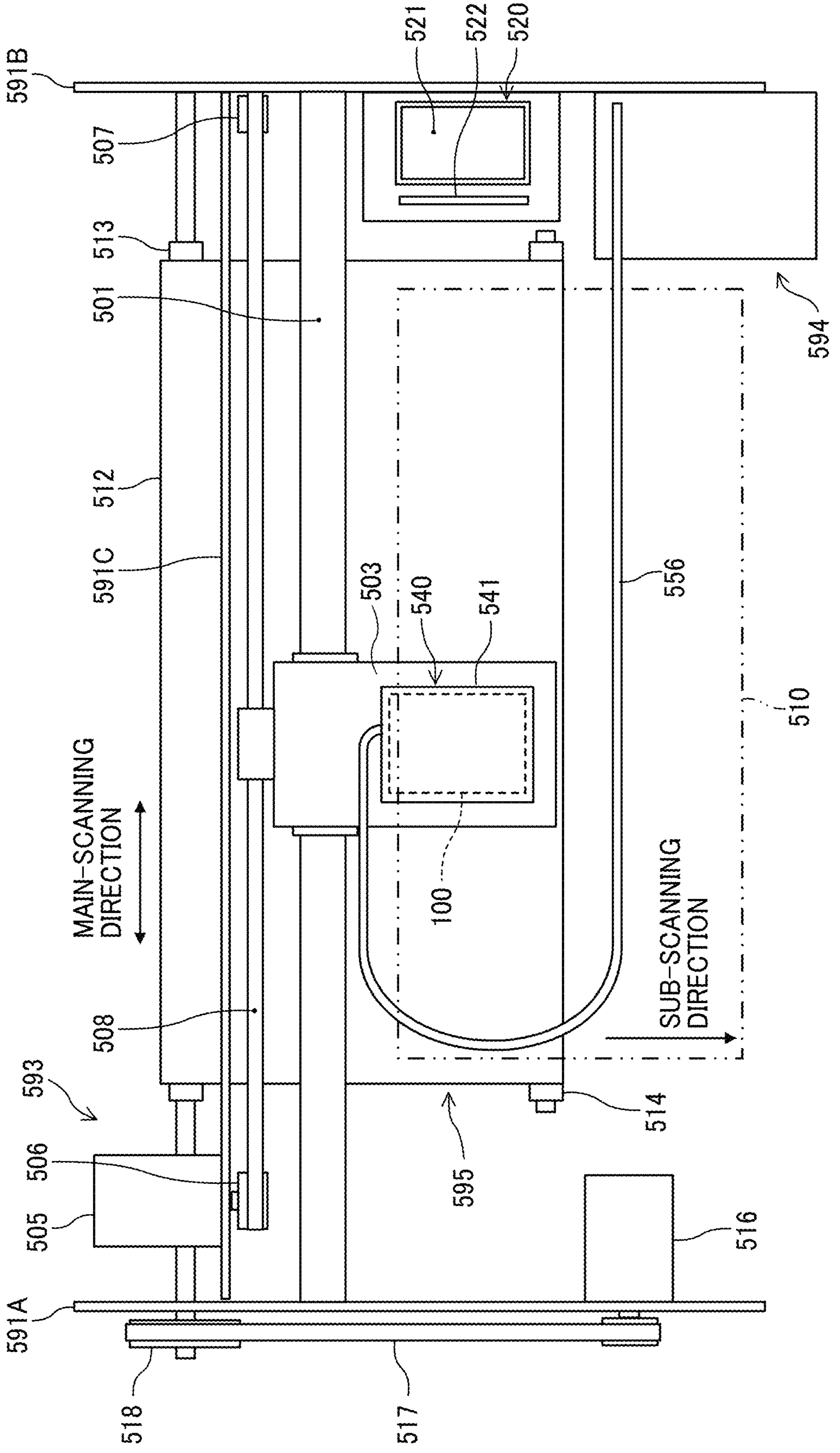
FIG. 4 is an explanatory plan view of the main part of a liquid discharge apparatus according to the present embodiment.
Figure 5:
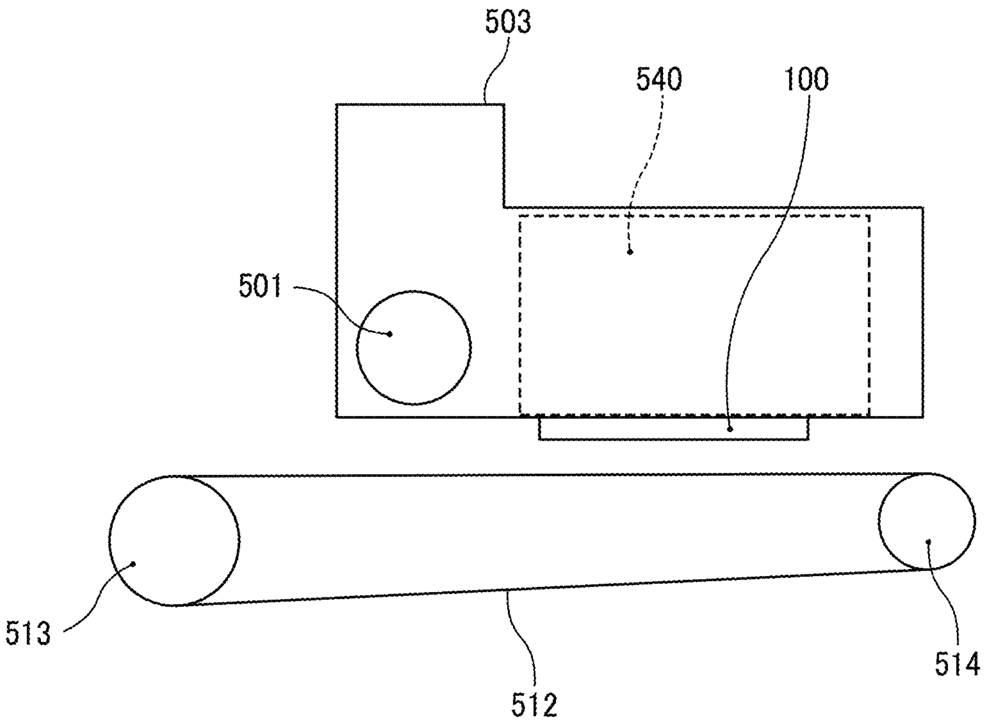
FIG. 5 is an explanatory side view of the main part of the liquid discharge apparatus according to the present embodiment.

FIG. 4 is an explanatory plan view of the main part of the liquid discharge apparatus according to the present embodiment. FIG. 5 is an explanatory side view of the main part of the liquid discharge apparatus according to the present embodiment.

The liquid discharge apparatus is a serial-type apparatus including a carriage 503 and a main-scanning movement mechanism 593 that reciprocally moves the carriage 503 in the main-scanning direction. The main-scanning movement mechanism 593 includes, for example, a guide member 501, a main-scanning motor 505, a timing belt 508. The guide member 501 is bridged between a side plate 591A and a side plate 591B provided, respectively, on one side and the other side in the longitudinal direction of the liquid discharge apparatus, and movably holds the carriage 503. The carriage 503 is reciprocated in the main-scanning direction as the longitudinal direction of the liquid discharge apparatus by the main-scanning motor 505 through the timing belt 508 stretched over a driving pulley 506 and a driven pulley 507.

The carriage 503 is provided with a liquid discharge unit 540 on which the liquid discharge head 100 is mounted. The liquid discharge head 100 of the liquid discharge unit 540 discharges liquid of each color, for example, yellow (Y), cyan (C), magenta (M), and black (K). The liquid discharge head 100 includes a nozzle array including multiple nozzles disposed in the sub-scanning direction orthogonal to the main-scanning direction. The liquid discharge head 100 is mounted with the nozzle array facing downward for discharge. The liquid discharge head 100 further includes a supply mechanism 594. The supply mechanism 594 supplies the liquid stored outside the liquid discharge head 100 into the liquid discharge head 100.

The supply mechanism 594 includes, for example, a cartridge holder as a loading portion for attaching a liquid cartridge and a liquid feeding unit including a liquid feeding pump. The liquid cartridge is detachably attached to the cartridge holder. Liquid is fed from the liquid cartridge to a head tank leading to the supply port 19 of the liquid discharge head 100 by the liquid feeding unit through a tube 556.

The liquid discharge apparatus further includes a conveyance mechanism 595 for conveying a sheet 510. The conveyance mechanism 595 includes, for example, a conveyance belt 512 as a conveyor and a sub-scanning motor 516 for driving the conveyance belt 512. The conveyance belt 512 attracts the sheet 510 to convey the sheet 510 to a position facing the liquid discharge head 100. The conveyance belt 512 is an endless belt stretched over a conveyance roller 513 and a tension roller 514. The conveyance belt 512 can attract the sheet 510 by, for example, electrostatic attraction or air suction. The sub-scanning motor 516 drives rotationally the conveyance roller 513 through a timing belt 517 and a timing pulley 518, so that the conveyance belt 512 circumferentially runs in the sub-scanning direction.

On one side in the main-scanning direction of the carriage 503, a maintenance mechanism 520 is disposed. The maintenance mechanism 520 maintains the liquid discharge head 100 and is disposed laterally to the conveyance belt 512. The maintenance mechanism 520 includes, for example, a cap member 521 for capping the nozzle face (face with the nozzles) of the liquid discharge head 100 and a wiper member 522 for wiping the nozzle face.

The main-scanning movement mechanism 593, the supply mechanism 594, the maintenance mechanism 520, and the conveyance mechanism 595 are attached to a housing including, for example, the side plate 591A, the side plate 591B, and a back plate 591C. In the liquid discharge apparatus having such a configuration as described above, a sheet 510 is fed and attracted onto the conveyance belt 512, and the sheet 510 is conveyed in the sub-scanning direction by the circumferential running of the conveyance belt 512. Then, the liquid discharge head 100 is driven in response to an image signal while the carriage 503 is moved in the main-scanning direction. Liquid is discharged onto the sheet 510 remaining stopped, so that an image is formed onto the sheet 510. As described above, because the liquid discharge apparatus includes the liquid discharge head 100 of the present embodiment, a high-quality image can be formed stably.

Next, another example of the liquid discharge unit 540 will be described with reference to FIG. 6.

Figure 6:
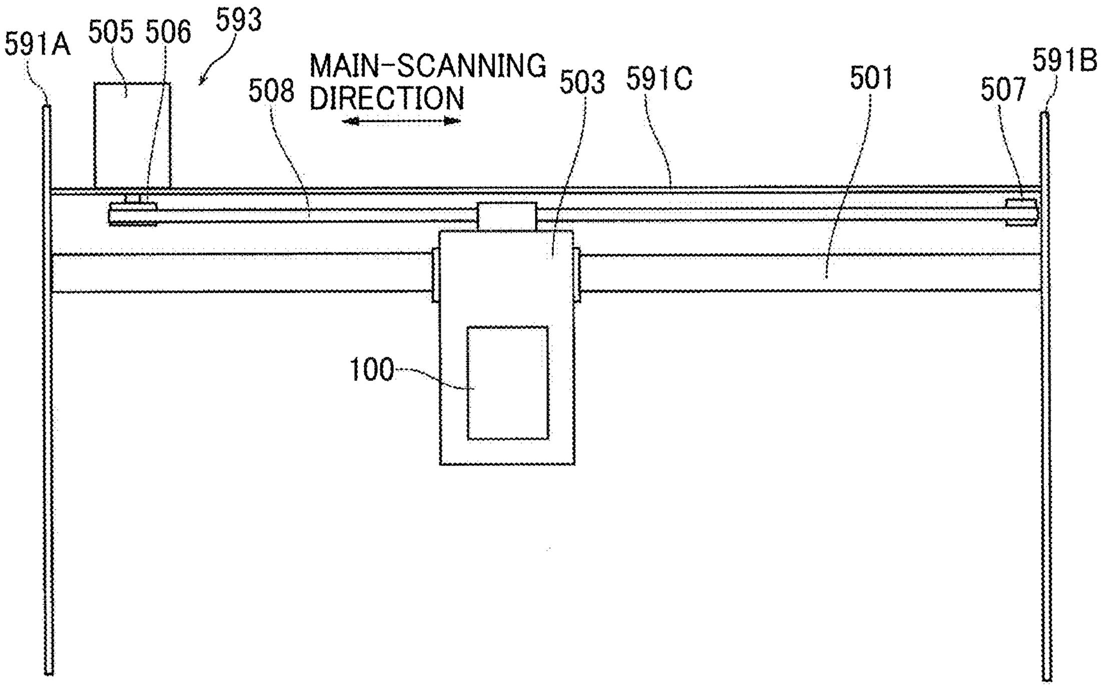
FIG. 6 is an explanatory plan view of the main part of a liquid discharge unit.

FIG. 6 is an explanatory plan view of the main part of a liquid discharge unit 540 as the other example.

The liquid discharge unit 540 includes a housing including a side plate 591A, a side plate 591B, a back plate 591C; a main-scanning movement mechanism 593; a carriage 503; and a liquid discharge head 100 among the members included in the liquid discharge apparatus. The liquid discharge unit 540 may include at least either such a maintenance mechanism 520 or a supply mechanism 594 as described above further attached to, for example, the side plate 591B of the liquid discharge unit 540.

In the present embodiment, the term "liquid discharge head" refers to a functional part that discharges or ejects liquid through a nozzle. Liquid to be discharged through the nozzle is not limited to a particular liquid as long as the liquid has a viscosity or surface tension to be discharged from the liquid discharge head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent such as water or an organic solvent; a colorant such as dye or pigment; a functional material such as a polymerizable compound, a resin, or a surfactant; a biocompatible material such as deoxyribonucleic acid (DNA), amino acid, protein, or calcium; or an edible material such as a natural colorant. Such a solution, a suspension, or an emulsion can be used for, for example, inkjet ink; surface treatment solution; a liquid for forming components of an electronic element or light-emitting element or forming a resist pattern of an electronic circuit; or a material solution for three-dimensional fabrication. Examples of a source for generating energy to discharge liquid include a piezoelectric actuator (a layered piezoelectric element or a thin-film piezoelectric element); a thermal actuator including a thermoelectric conversion element such as a heating resistor; and an electrostatic actuator including a diaphragm and opposed electrodes.

The term "liquid discharge unit" refers to an assembly of parts relating to liquid discharge, and represents a structure including, as a single unit, a combination of the liquid discharge head and a functional part or mechanism. Examples of the "liquid discharge unit" include a combination of the liquid discharge head with at least one of a supply/circulation mechanism, a carriage, a maintenance mechanism, and a main-scanning movement mechanism. Examples of the "single unit" include a combination in which the liquid discharge head and the functional part or mechanism secured to each other through, for example, fastening, bonding, or engaging, and a combination in which one of the liquid discharge head and the functional part or mechanism is movably held by the other. The liquid discharge head may be detachably attached to the functional part or mechanism each other.

Examples of the liquid discharge unit include, as a single unit, a combination of the liquid discharge head and the supply/circulation mechanism. The examples of the liquid discharge unit include, as a single unit, a combination of the liquid discharge head and the supply/circulation mechanism mutually connected through a tube. A filter unit may be disposed between such a supply/circulation mechanism and a liquid discharge head as described above of the liquid discharge unit. The examples of the liquid discharge unit include, as a single unit, a combination of the liquid discharge head and the carriage. The examples of the liquid discharge unit include, as a single unit, a combination of the liquid discharge head and a scanning movement mechanism. The liquid discharge head is movably held by a guide member included in part of the scanning movement mechanism. The examples of the liquid discharge unit include, as a single unit, a combination of the liquid discharge head, the carriage, and the maintenance mechanism. A cap member as part of the maintenance mechanism is secured to the carriage to which the liquid discharge head is attached. The examples of the liquid discharge unit include, as a single unit, a combination of the liquid discharge head and a supply mechanism. The liquid discharge head to which the supply/circulation mechanism or a channel part is attached is coupled to a tube. Liquid in a liquid store source is supplied to the liquid discharge head through the tube. The main-scanning movement mechanism may include a guide member only. The supply mechanism may include a tube only or a loading portion only.

The term "liquid discharge apparatus" refers to an apparatus including the liquid discharge head or the liquid discharge unit, and drives the liquid discharge head to discharge liquid. Examples of the liquid discharge apparatus also include an apparatus that discharges liquid to a material on which the liquid can adhere and an apparatus that discharges liquid into gas or liquid. The liquid discharge apparatus may also include a device to feed, convey, or eject a material on which liquid can adhere. The liquid discharge apparatus may further include a pretreatment device and a post-treatment device.

Examples of the "liquid discharge apparatus" include an image forming apparatus for discharging ink to form an image onto a sheet, or a three-dimensional fabrication apparatus for discharging a fabrication liquid to a powder layer including layers of powder materials to form a three-dimensional fabrication object. The "liquid discharge apparatus" is not limited to an apparatus for discharging liquid to visualize meaningful images, such as letters or figures. The examples of the "liquid discharge apparatus" may also include an apparatus to form meaningless patterns, or fabricate three-dimensional images.

The term "material on which liquid can adhere" represents a material on which liquid at least temporarily adheres, a material on which liquid adheres to be fixed, or a material on which liquid adheres to permeate into the material. Examples of the "material on which liquid can adhere" include media for recording, such as a sheet, recording paper, a recording sheet, a film, and cloth; electronic components such as an electronic substrate and a piezoelectric element; and media such as a powder layer, an organ model, and a testing cell, and thus include any material on which liquid adheres, unless particularly limited. Examples of the "material on which liquid can adhere" include any material on which liquid can adhere even temporarily, such as paper, thread, fiber, fabric, leather, metal, plastic, glass, wood, and ceramic.

The "liquid" may be any liquid having a viscosity or a surface tension that can be discharged from the liquid discharge head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent such as water or an organic solvent; a colorant such as dye or pigment; a functional material such as a polymerizable compound, a resin, or a surfactant; a biocompatible material such as deoxyribonucleic acid (DNA), amino acid, protein, or calcium; or an edible material such as a natural colorant. Such a solution, a suspension, or an emulsion can be used for, for example, inkjet ink; surface treatment solution; a liquid for forming components of an electronic element or light-emitting element or forming a resist pattern of an electronic circuit; or a material solution for three-dimensional fabrication.

The "liquid discharge apparatus" may be an apparatus to relatively move the liquid discharge head and a material on which liquid can adhere. The liquid discharge apparatus, however, is not limited to such an apparatus. Examples of the liquid discharge apparatus include a serial-type apparatus that moves the liquid discharge head or a line-type apparatus that does not move the liquid discharge head. Examples of the "liquid discharge apparatus" include a treatment liquid coating apparatus that discharges a treatment liquid to a sheet to coat the treatment liquid on a sheet surface for reforming the sheet surface. The examples of the "liquid discharge apparatus" include an injection granulation apparatus for spraying a composition liquid with a raw material dispersed in a solution through a nozzle to granulate fine particles of the raw material. The terms, for example, "image formation", "recording", "printing", "image printing", and "fabricating" used herein may be used synonymously with each other.

The above embodiments are merely examples, and thus the present disclosure includes, for example, the following aspects each having advantageous effects.

Aspect 1

A liquid discharge head 100 includes: multiple nozzles 4; multiple individual chambers such as a pressure generation chamber 6; multiple fluid restrictors 7; a common chamber 10; and multiple actuators such as a piezoelectric actuator 11, in which the multiple nozzles 4 is in communication one-to-one with the multiple individual chambers, the multiple individual chambers is in communication one-to-one with the fluid restrictors 7, the multiple individual chambers corresponds one-to-one to the multiple actuators, liquid such as ink is supplied from the common chamber 10 to each of the multiple individual chambers through the corresponding fluid restrictor 7, the liquid in each of the multiple individual chambers is discharged through the corresponding nozzle 4 due to drive of the corresponding actuator, and a meniscus formed at each of the multiple nozzles 4 has a natural period of vibration as the period of supply of the liquid from the common chamber 10 to the individual chamber different from a resonant period of the common chamber 10, half of the resonant period of the common chamber 10, and a quarter of the resonant period of the common chamber 10.

When a drive waveform is applied to the actuator to drive the actuator, a pressure wave having a period of the drive waveform (hereinafter, referred to as a drive pressure wave) is generated in the individual chamber. The drive pressure wave propagates to the common chamber through the fluid restrictor. When the period of the drive pressure wave is close to the resonant period of the common chamber, resonance occurs and the pressure wave in the common chamber increases. The increased pressure wave (hereinafter, referred to as resonant pressure wave) propagates to the individual chamber through the fluid restrictor, resulting in variation in the discharge rate of the liquid droplets from the nozzle. In order to inhibit the variation in the discharge rate of the liquid droplets from the nozzle, it is conceivable that a drive waveform having a period close to the resonant period of the common chamber is not applied to generate no resonant pressure wave. However, due to restriction on the drive frequency, there is a possibility that a desired image cannot be obtained.

According to the verification test described above by the persons of the present embodiment, it is found that even when the actuator is driven with the drive waveform having the same period as the resonant period of the common chamber and the resonant pressure wave is generated, depending on the natural period of vibration of the meniscus, the landing position deviation due to the variation in the discharge rate of the liquid droplets from the nozzle and the non-uniformity of the landing area can be suppressed to the allowable level or less, and the image quality can be made to the allowable level. Specifically, it is found that when the natural period of vibration of the meniscus is different from the resonant period of the common chamber, half of the resonant period of the common chamber, and a quarter of the resonant period of the chamber, the landing position deviation and the non-uniformity of the landing area can be suppressed to the allowable level or less, and the image quality can be made to the allowable level.

After the liquid discharge, the meniscus of the nozzle is drawn into the individual chamber side and then reduced by free vibration to return to the initial position. Due to the free vibration of the meniscus, a pressure wave having a natural period of vibration of the meniscus is generated in the individual chamber. When the natural period of vibration of the meniscus corresponds to the resonant period of the common chamber, half of the resonant period of the common chamber, or a quarter of the resonant period of the common chamber, the pressure wave resulting from the free vibration of the meniscus strengthens with the resonant pressure wave propagated to the individual chamber, and the pressure variation in the individual chamber increases. As a result, it is considered that the variation in the discharge rate of the liquid droplets from the nozzle increases, the landing position deviation and the non-uniformity of the landing area are out of the allowable range, and the image quality is not more than the allowable level.

On the other hand, it is considered that when the natural period of vibration of the meniscus is made different from the resonant period of the common chamber, half of the resonant period of the common chamber, and a quarter of the resonant period of the common chamber, it is considered that, in the pressure chamber, due to inhibition in strengthen of the pressure wave resulting from the free vibration of the meniscus and the resonant pressure wave propagated to the individual chamber, the landing position deviation and the non-uniformity of the landing area can be suppressed to the allowable level or less, and the image quality can be made to the allowable level.

On the basis of the results of such a verification test, in Aspect 1, the natural period of vibration of the meniscus formed at the nozzle is made different from the resonant period of the common chamber, half of the resonant period of the common chamber, and a quarter of the resonant period of the common chamber. With this arrangement, deterioration of image quality due to variation of the discharge rate of the liquid droplets from the nozzle can be inhibited without restriction on the drive frequency for driving the actuator. As a result, the actuator can be driven even with a drive waveform having a period close to the resonant period of the common chamber.

Aspect 2

In Aspect 1, the natural period of vibration of the meniscus and the resonant period of the common chamber, defined as Tmr and Tk, are obtained by the following expressions (1) and (2), respectively:

$$Tmr=2\pi\sqrt{\{(Lp+Lr+Lt+Ls)\times Cm\}} \quad (1)$$

$$Tk=2\pi\times\sqrt{(Lk\times Ck)} \quad (2)$$

where $Lp=(6/5)\times\rho\times lp/sp$, $Lr=(6/5)\times\rho\times lr/sr$, $Lt=4\times\rho\times lt/(\pi\times dt\times ds)\times 1.45$, $Ls=4\times\rho\times ls/(\pi\times ds^2)\times 1.45$, and $Cm=\pi\times ds^4/(128\times\gamma)$, $Lk=6/5\times\rho\times lk/sk$, and $Ck=lk\times sk/(\rho\times c2)$ where p represents a density of the liquid, c represents a velocity of sound of the liquid, lp represents a length of each of the multiple individual chambers in a liquid flow direction from the corresponding fluid restrictor to the individual chamber, sp represents a cross-sectional area perpendicular to the liquid flow direction of each of the multiple individual chambers, lr represents a length of each of the multiple fluid restrictors in the liquid flow direction, sr represents a cross-sectional area perpendicular to the liquid flow direction of the each of the multiple fluid restrictors, lt represents a length of a tapered portion of each of the multiple nozzles, ls represents a length of a straight portion of each of the multiple nozzles, dt represents a maximum diameter of the tapered portion of each of the multiple nozzles, ds represents a diameter of the straight portion of each of the multiple nozzles, γ represents a surface tension of the liquid, lk represents a length of the common chamber in an array direction in which the multiple individual chambers are arrayed, and sk represents a cross-sectional area of the common chamber perpendicular to the array direction of in which the multiple individual chambers is arrayed.

According to Aspect 2, depending on the shape of the individual chamber such as the pressure generation chamber 6, the shape of the nozzle, and the shape of the common chamber, the natural period of vibration of the meniscus can be made different from the resonant period of the common chamber 10, half of the resonant period of the common chamber 10, and a quarter of the resonant period of the common chamber 10.

Aspect 3

In Aspect 1 or Aspect 2, the natural period of vibration of the meniscus and the resonant period of the common chamber are defined as Tmr and Tk, respectively, and any of the following conditions is satisfied: $Tmr/Tk \leq 0.22$, $0.28 \leq Tmr/Tk \leq 0.45$, $0.55 \leq Tmr/Tk \leq 0.9$, and $1.1 \leq Tmr/Tk$.

According to Aspect 3, as described in the verification test, the non-uniformity of the landing position and the landing area can be suppressed to the allowable level.

Aspect 4

In Aspect 3, any of the following conditions is satisfied: $Tmr/Tk \leq 0.2$, $0.3 \leq Tmr/Tk \leq 0.4$, $0.6 \leq Tmr/Tk \leq 0.8$, and $1.2 \leq Tmr/Tk$.

According to Aspect 4, as described in the verification test, deterioration of image quality due to the non-uniformity of the landing position and the non-uniformity of the landing area can be favorably inhibited, and a high-quality image can be obtained.

Aspect 5

A liquid discharge unit includes the liquid discharge head according to any of Aspect 1 to Aspect 4.

According to Aspect 5, as described in the embodiments, even if the period of the drive pressure wave generated due to drive of the actuator such as the piezoelectric actuator 11 is the same as the resonant period of the common chamber 10, deterioration of image quality due to the non-uniformity of the landing position and the non-uniformity of the landing area can be inhibited. As a result, a high-quality image can be obtained without restriction on the drive frequency for driving the actuator.

Aspect 6

A liquid discharge apparatus includes the liquid discharge head according to any of Aspect 1 to Aspect 4.

According to Aspect 6, as described in the embodiments, even if the period of the drive pressure wave generated due to drive of the actuator such as the piezoelectric actuator 11 is the same as the resonant period of the common chamber 10, deterioration of image quality due to the non-uniformity of the landing position and the non-uniformity of the landing area can be inhibited. As a result, a high-quality image can be obtained without restriction on the drive frequency for driving the actuator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

multiple nozzles;

multiple individual chambers respectively communicating with the multiple nozzles;

a common chamber communicating with each of the multiple individual chambers;

multiple fluid restrictors between each of the multiple individual chambers and the common chamber; and multiple actuators driven to cause a liquid in the multiple individual chambers to be discharged from the multiple nozzles, a meniscus formed at each of the multiple nozzles has a natural period of vibration different from each of:

a resonant period of the common chamber;

half of the resonant period of the common chamber; and a quarter of the resonant period of the common chamber.

2. The liquid discharge head according to claim 1, wherein the natural period of vibration of the meniscus defined as Tmr and the resonant period of the common chamber defined as Tk are obtained by following expressions (1) and (2), respectively:

$$Tmr = 2\pi\sqrt{\{(Lp+Lr+Lt+Ls)\times Cm\}} \quad (1)$$

$$Tk = 2\pi\times\sqrt{(Lk\times Ck)} \quad (2)$$

where $Lp=(6/5)\times\rho\times lp/sp$, $Lr=(6/5)\times\rho\times lr/sr$, $Lt=4\times\rho\times lt/(\pi\times dt\times ds)\times 1.45$, $Ls=4\times\rho\times ls/(\pi\times ds^2)\times 1.45$, and $Cm=\pi\times ds^4/(128\times\gamma)$, $Lk=6/5\times\rho\times lk/sk$, and $Ck=lk\times sk/(\rho\times c2)$ where ρ represents a density of the liquid, c represents a velocity of sound of the liquid, lp represents a length of each of the multiple individual chambers in a liquid flow direction flowing from the multiple fluid restrictors to the multiple individual chambers, respectively, sp represents a cross-sectional area perpendicular to the liquid flow direction of each of the multiple individual chambers, lr represents a length of each of the multiple fluid restrictors in the liquid flow direction, sr represents a cross-sectional area perpendicular to the liquid flow direction of the each of the multiple fluid restrictors, lt represents a length of a tapered portion of each of the multiple nozzles, ls represents a length of a straight portion of each of the multiple nozzles, dt represents a maximum diameter of the tapered portion of each of the multiple nozzles, ds represents a diameter of the straight portion of each of the multiple nozzles, γ represents a surface tension of the liquid, lk represents a length of the common chamber in an array direction in which the multiple individual chambers are arrayed, and sk represents a cross-sectional area of the common chamber perpendicular to the array direction of the multiple individual chambers.

3. The liquid discharge head according to claim 1, wherein any of following conditions is satisfied:

$$Tmr/Tk \leq 0.22,$$

$$0.28 \leq Tmr/Tk \leq 0.45,$$

$$0.55 \leq Tmr/Tk \leq 0.9, \text{ and}$$

$$1.1 \leq Tmr/Tk$$

where the natural period of vibration of the meniscus is defined as Tmr, and the resonant period of the common chamber is defined as Tk.

4. The liquid discharge head according to claim 3, wherein any of following conditions is satisfied:

$$Tmr/Tk \leq 0.2,$$

$$0.3 \leq Tmr/Tk \leq 0.4,$$

$$0.6 \leq Tmr/Tk \leq 0.8, \text{ and}$$

$$1.2 \leq Tmr/Tk.$$

5. A liquid discharge unit comprising the liquid discharge head according to claim 1.

6. A liquid discharge apparatus comprising the liquid discharge head according to claim 1.

* * * * *